United States Patent
Salvestrini

(10) Patent No.: US 9,084,324 B2
(45) Date of Patent: Jul. 14, 2015

(54) LOAD CONTROL DEVICE HAVING AUTOMATIC SETUP FOR CONTROLLING CAPACITIVE AND INDUCTIVE LOADS

(71) Applicant: Lutron Electronics Co., Inc., Coopersburg, PA (US)

(72) Inventor: Christopher J. Salvestrini, Allentown, PA (US)

(73) Assignee: LUTRON ELECTRONICS CO., INC., Coopersburg, PA (US)

(*) Notice: Subject to any disclaimer, the term of this patent is extended or adjusted under 35 U.S.C. 154(b) by 0 days.

(21) Appl. No.: 13/777,784

(22) Filed: Feb. 26, 2013

(65) Prior Publication Data
US 2014/0239842 A1 Aug. 28, 2014

(51) Int. Cl.
H05B 37/02 (2006.01)
H05B 33/08 (2006.01)

(52) U.S. Cl.
CPC ........ H05B 33/0845 (2013.01); H05B 33/0815 (2013.01); *Y02B 20/346* (2013.01)

(58) Field of Classification Search
USPC ................. 315/291, 293, 294, 297, 307, 314
See application file for complete search history.

(56) References Cited

U.S. PATENT DOCUMENTS

| | | | |
|---|---|---|---|
| 5,038,081 A | 8/1991 | Maiale, Jr. et al. |
| 5,175,477 A | 12/1992 | Grissom |
| 5,239,255 A | 8/1993 | Schanin et al. |
| 5,424,618 A | 6/1995 | Bertenshaw et al. |
| 5,510,679 A | 4/1996 | Maiale, Jr. et al. |
| 5,600,233 A | 2/1997 | Warren et al. |
| 5,629,607 A | 5/1997 | Callahan et al. |
| 5,672,941 A | 9/1997 | Callahan et al. |
| 5,821,703 A | 10/1998 | Callahan et al. |
| 6,346,778 B1 | 2/2002 | Mason et al. |
| 6,466,456 B2 | 10/2002 | Sauerlaender et al. |
| 6,538,346 B2 | 3/2003 | Pidutti et al. |
| 6,813,720 B2 | 11/2004 | LeBlanc |
| 7,190,124 B2 | 3/2007 | Kumar et al. |
| 7,190,125 B2 | 3/2007 | McDonough et al. |
| 7,259,524 B2 | 8/2007 | Hausman, Jr. et al. |
| 7,358,627 B2 | 4/2008 | Black et al. |
| 7,619,365 B2 | 11/2009 | Davis et al. |
| 8,085,009 B2 | 12/2011 | Lumsden |
| 8,085,160 B2 | 12/2011 | Vanderzon |
| 8,120,307 B2 | 2/2012 | Lumsden |
| 8,208,235 B2 | 6/2012 | Orchowski |

(Continued)

FOREIGN PATENT DOCUMENTS

| | | |
|---|---|---|
| EP | 0618667 | 10/1994 |
| EP | 2 020 830 A2 | 2/2009 |
| WO | WO 92/15052 | 9/1992 |

*Primary Examiner* — Tung X Le
(74) *Attorney, Agent, or Firm* — Condo Roccia Koptiw LLP

(57) ABSTRACT

A load control device, such as an LED dimmer switch, for example, may be configured to automatically determine whether to provide a forward or reverse phase control signal to a load. As disclosed herein, such a load control device may provide a plurality of different control signals to the lighting load, for example, during an initial set-up procedure. The load control device may provide the plurality of different control signals to determine an appropriate control signal for the load. Each control signal may be characterized by a load control type and a switching time. The load control type may be one of a forward phase control type, a reverse phase control type, or a full conduction control type. The switching time may include, but is not limited to, switching times of approximately 0 µs, 10 µs, 50 µs, and 100 µs.

36 Claims, 6 Drawing Sheets

(56) References Cited

U.S. PATENT DOCUMENTS

| | | |
|---|---|---|
| 8,242,714 B2 | 8/2012 | Weightman et al. |
| 8,253,394 B2 | 8/2012 | Hirst |
| 8,884,537 B2 * | 11/2014 | Liao et al. ............. 315/200 R |
| 2005/0285576 A1 | 12/2005 | Achart et al. |
| 2007/0126368 A1 | 6/2007 | McDonough et al. |
| 2007/0182347 A1 * | 8/2007 | Shteynberg et al. ......... 315/312 |
| 2007/0216375 A1 | 9/2007 | Achart et al. |
| 2008/0246414 A1 | 10/2008 | Xu et al. |
| 2008/0258647 A1 * | 10/2008 | Scianna ..................... 315/291 |
| 2008/0284350 A1 | 11/2008 | Xu et al. |
| 2008/0315787 A1 * | 12/2008 | Xu .............................. 315/291 |
| 2009/0096384 A1 | 4/2009 | Vanderzon |
| 2009/0096625 A1 | 4/2009 | Vanderzon |
| 2009/0103223 A1 | 4/2009 | Prussmeier |
| 2009/0284182 A1 | 11/2009 | Cencur |
| 2010/0013405 A1 * | 1/2010 | Thompson et al. ........... 315/291 |
| 2010/0327778 A1 | 12/2010 | Schanin et al. |
| 2011/0012530 A1 | 1/2011 | Zheng et al. |
| 2011/0121752 A1 | 5/2011 | Newman, Jr. et al. |
| 2011/0121812 A1 | 5/2011 | Salvestrini |
| 2012/0033471 A1 | 2/2012 | Newman, Jr. |
| 2012/0049749 A1 | 3/2012 | Pearlman et al. |
| 2012/0230073 A1 | 9/2012 | Newman, Jr. et al. |

* cited by examiner

US 9,084,324 B2

LOAD CONTROL DEVICE HAVING AUTOMATIC SETUP FOR CONTROLLING CAPACITIVE AND INDUCTIVE LOADS

BACKGROUND

Light-emitting diode (LED) light sources may be used as replacements for conventional incandescent lamps. LED light sources may include a plurality of light-emitting diodes mounted on a single structure and provided in a suitable housing. The LEDs may be coupled in series and/or in parallel.

LED light sources may be more efficient and may provide longer operational lives as compared to incandescent lamps. In order to illuminate properly, an LED driver may be coupled between an alternating-current (AC) power source and the LED light source for regulating the operating current and operating voltage supplied to the LED light source. For example, the LED driver may be integrated into a base of a screw-in LED bulb. Additionally, in order to provide an end user the ability to control the intensity of the LED light sources, a load control device, such as a dimmer switch, for example, may be utilized to control the LED driver. The load control device may provide a control signal to the LED driver.

LED drivers may exhibit different operating characteristics, such as impedance characteristics, for example, depending on the manufacturer and/or model of the LED driver. Different impedance characteristics may require different types of phase control signals to be provided by the load control device in order to control the LED driver and to dim the LED light source properly.

Typical LED drivers are characterized by both capacitive and inductive impedance. In order to properly control an LED driver having a predominately capacitive impedance, the load control device should provide a reverse phase control signal to the LED driver. In order to properly control an LED driver having a predominately inductive impedance, the load control device should provide a forward phase control signal to the LED driver.

SUMMARY

A load control device, such as an LED dimmer switch, for example, may be configured to automatically determine whether to provide a forward or reverse phase control signal to an electrical load, such as an LED lamp, for example. As disclosed herein, such a load control device may provide a plurality of different control signals to the load, for example, during an initial set-up procedure. The load control device may provide the plurality of different control signals to determine an appropriate control signal for the load. Each control signal may be characterized by a load control type and a switching time. The load control type may be one of a forward phase control type, a reverse phase control type, or a full conduction control type. The switching time may include, but is not limited to, switching times of approximately 0 μs, 10 μs, 50 μs, and 100 μs.

The load control device may begin by assuming that the load has a predominately capacitive impedance. The load control device may begin by providing a reverse phase control signal with an initial switching time. The load control device may determine whether the reverse phase control signal is inappropriate for the load. If the load control device determines that the reverse phase control signal is inappropriate for the load, then the load control device may provide a reverse phase control signal with an increased switching time. The load control device may continue to determine the appropriateness of reverse phase control signals, increasing the switching time each time the load control device determines that the reverse phase control signal is inappropriate for the load. For example, the load control device may increase the switching time of a reverse phase control signal three times (e.g., from approximately 10 μs, to 50 μs, and to 100 μs).

If the load control device determines that a reverse phase control signal at one of the switching times is appropriate for the load, then the load control signal may store the reverse phase control signal and the associated switching time in memory, such as, to utilize during normal operation of the load, for example.

If the load control device determines that the reverse phase control signals at each of the different switching times are inappropriate for the load, then the load control device may provide a forward phase control signal with an initial switching time. The load control device may determine whether the forward phase control signal is inappropriate for the load. If the load control device determines that the forward phase control signal is inappropriate for the load, then the load control device may provide a forward phase control signal with an increased switching time. The load control device may continue to determine the appropriateness of forward phase control signals, increasing the switching time each time the load control device determines that the forward phase control signal is inappropriate for the load. For example, the load control device may increase the switching time of a forward phase control signal three times (e.g., from approximately 10 μs, to 50 μs, and to 100 μs).

If the load control device determines that a forward phase control signal at one of the switching times is appropriate for the load, then the load control signal may store the forward phase control signal and the associated switching time in memory, such as, to utilize during normal operation of the load, for example.

If the load control device determines that the forward phase control signals at each of the different switching times are inappropriate for the load, then the load control device may provide a full conduction control signal. The load control device may determine whether the full conduction control signal is appropriate for the load. If the load control device determines that the full conduction control signal is appropriate for the load, then the load control device may store the full conduction control signal in memory, such as, to utilize during normal operation of the load, for example. If the load control device determines that the full conduction control signal is inappropriate for the load, then the load control device may turn off.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1:
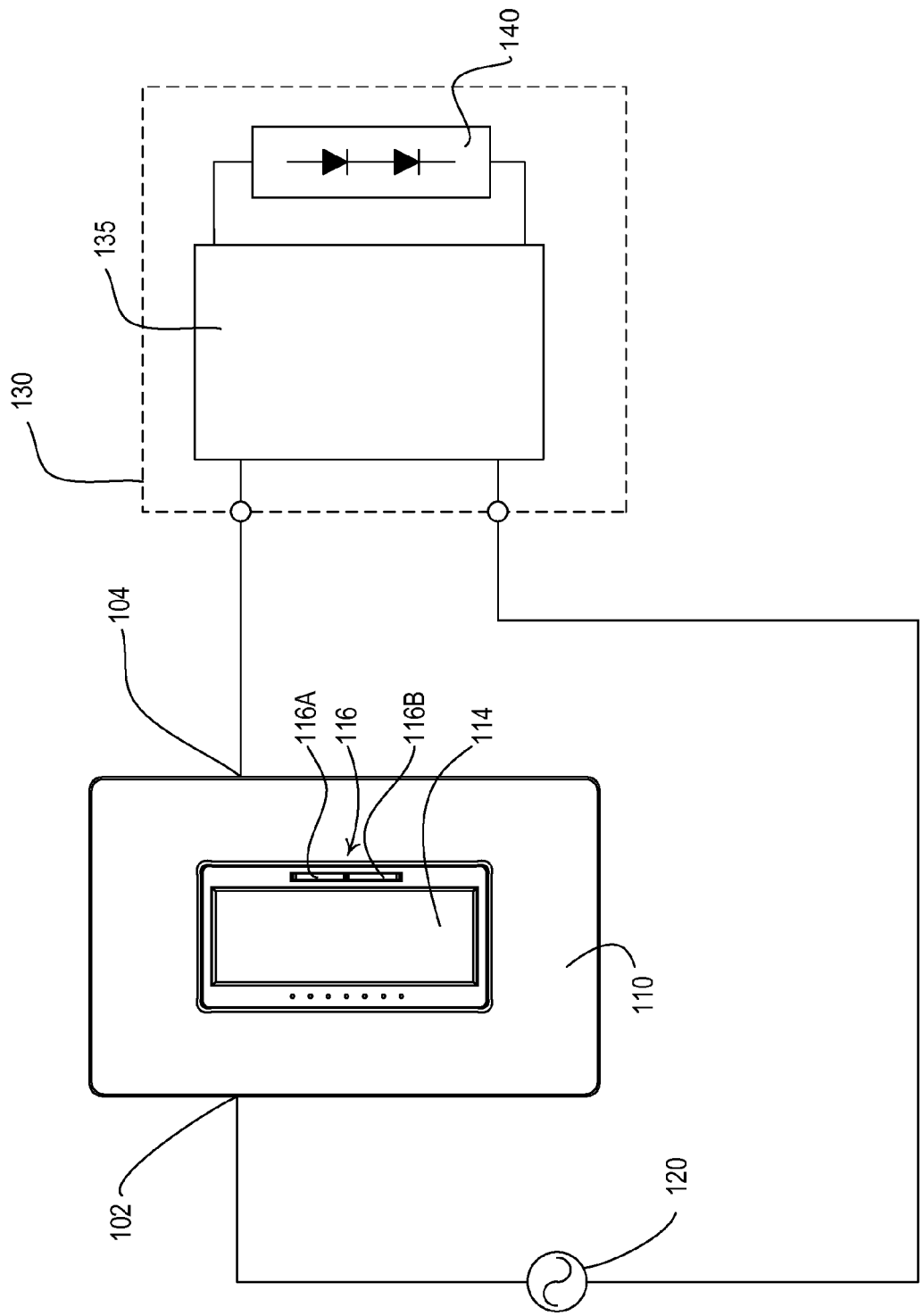
FIG. 1 illustrates an example of a dimmer switch coupled to an LED lamp.

FIG. 1 illustrates an example of a dimmer switch coupled to an LED lamp. A load control device (e.g., dimmer switch 110) may include a hot terminal 102 that is coupled to an AC power source 120, and a dimmed hot terminal 104 that is coupled to a load (e.g., an LED lamp 130). The LED lamp 130 may comprise an LED driver 135 and an LED light source 140. The LED lamp 130 may be coupled to the DH terminal 104 and the neutral connection of the AC power source 120. The dimmer switch 110 may be operable to provide a dimmed hot voltage (e.g., a phase control signal) to the LED lamp 130 for controlling the intensity of the LED lamp. The dimmer switch 110 may be operable to provide the dimmed hot voltage using different phase control types, e.g., forward phase control and reverse phase control. In addition, the dimmer switch 110 may be operable to provide a full conduction voltage to the LED lamp 130. The dimmer switch 110 may include a control actuator (e.g., a tap switch 114) for turning the LED light source 140 on and off, and an intensity adjustment actuator (e.g., a dimming rocker 116), which may be used to adjust the intensity of the LED light source 140 (e.g., increase and decrease the intensity by tapping the upper and lower portions 116A, 116B of the dimming rocker 116, respectively).

Figure 2:
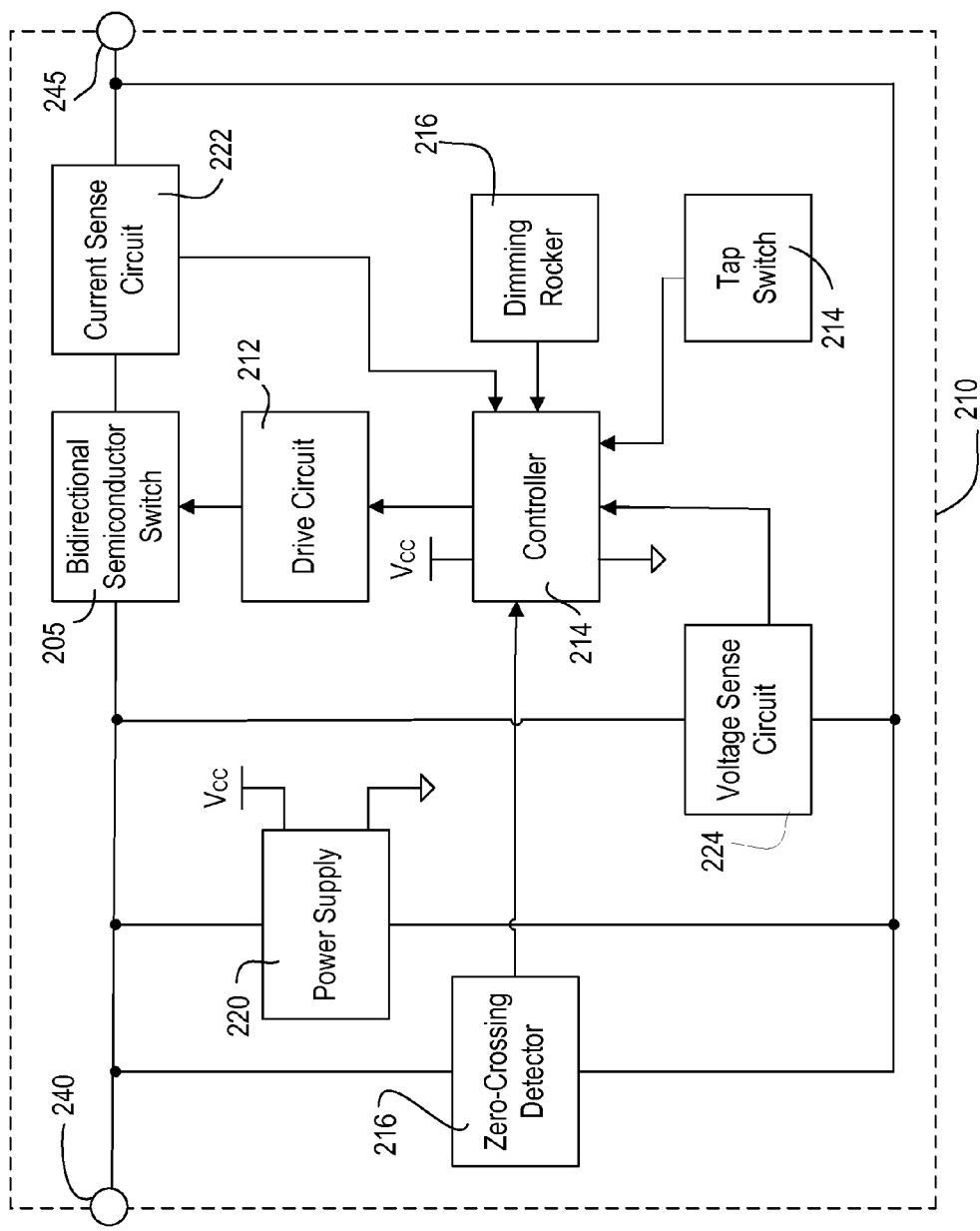
FIG. 2 is a simplified block diagram of an example dimmer switch.

FIG. 2 is a simplified block diagram of an example dimmer switch 210 (e.g., the dimmer switch 110 of FIG. 1). The dimmer switch 210 may comprise a bidirectional semiconductor switch 205 operably coupled in series electrical connection between a hot terminal 240 (e.g., the hot terminal 102) and dimmed hot terminal 245 (e.g., the dimmed hot terminal 104), for example, to control the amount of power delivered to a lighting load (e.g., the LED lamp 130). For example, the bidirectional semiconductor switch 205 of dimmer switch 210 may be implemented as two field effect transistors (FETs) in anti-series connection or a single FET inside a full-wave rectifying bridge for example, because these topologies may provide a reverse phase control signal, a forward phase control signal, or a full conduction voltage as will be described in greater detail below.

A controller 214 (e.g., a microprocessor) may be operably coupled to the bidirectional semiconductor switch 205, for example, via a drive circuit 212. The controller 214 may be coupled to the bidirectional semiconductor switch 205 for rendering the bidirectional semiconductor switch conductive and nonconductive. The controller 214 may be configured to control the bidirectional semiconductor switch 205 in response to a zero-crossing detector 216. The zero-crossing detector 216 may be configured to determine the zero-crossings of an input AC waveform from an AC power source via the hot (H) terminal 240. The controller 214 may receive inputs from a tap switch 214 (e.g., the tap switch 114) and/or a dimming rocker 216 (e.g., the dimming rocker 116). The controller 214 may receive inputs from a current sense circuit 222 and/or a voltage sense circuit 224. The current sense circuit 222 and/or the voltage sense circuit 224 may be operably coupled to the AC power source via the H terminal 240. The current sense circuit 222 and/or the voltage sense circuit 224 may be operably coupled to the load via the DH terminal 245. The current and voltage sense circuits 222, 224 may provide information to the controller such that the controller may determine an impedance characteristic of the load (e.g., as described with respect to FIG. 6). A power supply 220 may generate a direct-current (DC) voltage $V_{CC}$, for example, for powering the controller 214 and other low voltage circuitry of the dimmer switch 210.

Figure 3A:
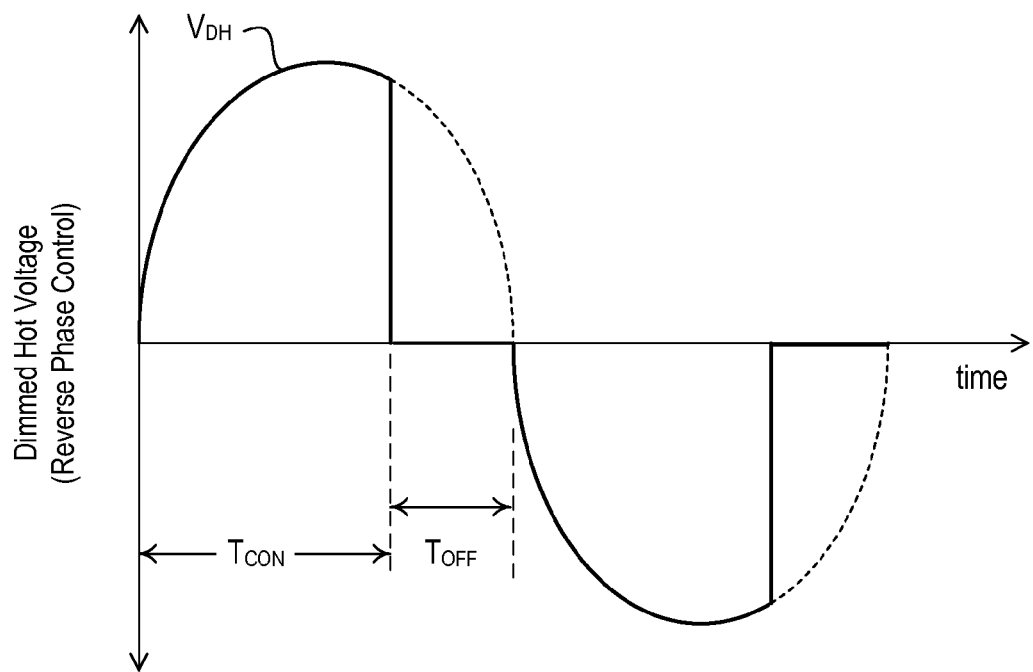
FIG. 3A illustrates an example waveform of a reverse phase dimmed hot control signal that may be provided to a load.

FIG. 3A illustrates an example waveform of a dimmed hot voltage $V_{DH}$ (e.g., a reverse phase control signal) that may be provided to a load (e.g., LED lamp 130) at a dimmed hot terminal (e.g., the dimmed hot terminal 104 of the dimmer switch 110). In each half cycle, a bidirectional semiconductor switch (e.g., the bidirectional semiconductor switch 205) may be conductive during a conduction time $T_{CON}$ (e.g., an on time) and non-conductive during an off time $T_{OFF}$. As the length of the conduction time $T_{CON}$ of the bidirectional semiconductor switch increases, an LED driver of the LED lamp may provide the appropriate amount of power to an LED light source in response to the dimmed hot voltage.

As mentioned, the dimmed hot voltage of FIG. 3A is a reverse phase control signal. The bidirectional semiconductor switch may be conductive at the beginning of each half cycle and may turn off later in the half cycle to generate a reverse phase control signal, for example, in order to provide the appropriate dimmed hot signal to the LED lamp. The bidirectional semiconductor switch may turn off at the beginning of the off time $T_{OFF}$. The voltage provided to the LED lamp may increase (e.g., gradually increase) at the start of each half cycle as the AC line voltage increases, for example, because the reverse phase control signal may be initially conductive at the beginning of each half cycle. An LED lamp having a predominantly capacitive impedance may be best suited to receive a dimmed hot signal with a gradual change in voltage. An LED lamp having a predominantly capacitive impedance may readily accept an abrupt removal of current, which, for example, may occur at the beginning of the off time $T_{OFF}$. Thus, a reverse phase control signal may be provided by a load control device (e.g., dimmer switch 110) to a load (e.g., LED lamp 130) having a predominately capacitive impedance. However, if an LED lamp that has an inductive impedance receives such a dimmed hot voltage (e.g., a reverse phase control signal), there may be excessive voltage present across the dimmer switch 110 when current is abruptly removed, which, for example may cause instability in the dimmer switch 110.

Figure 3B:
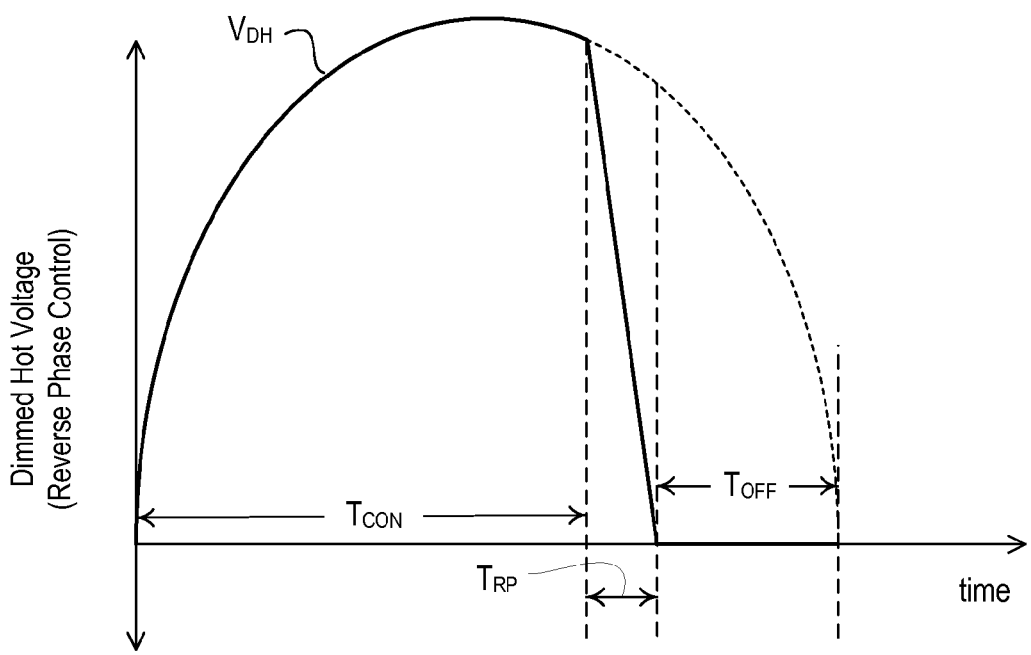
FIG. 3B illustrates a detailed view of a half cycle of an example waveform of a reverse phase dimmed hot control signal that may be provided to a load.

FIG. 3B illustrates a detailed view of a half cycle of an example waveform of a dimmed hot voltage (e.g., the reverse phase control signal of FIG. 3A) that may be provided to a load (e.g., the LED lamp 130). The example waveform of FIG. 3B may illustrate that the transition between the conductive time $T_{CON}$ and the off time $T_{OFF}$ of a reverse phase control signal may not occur instantaneously. Rather, the bidirectional semi-conductor switch may transition from the conductive state to the non-conductive during a reverse phase switching time $T_{RP}$. Although the example waveform of FIG. 3B illustrates the positive half cycle, the same transition behavior may apply in the negative half cycle of the reverse phase control signal.

Figure 4A:
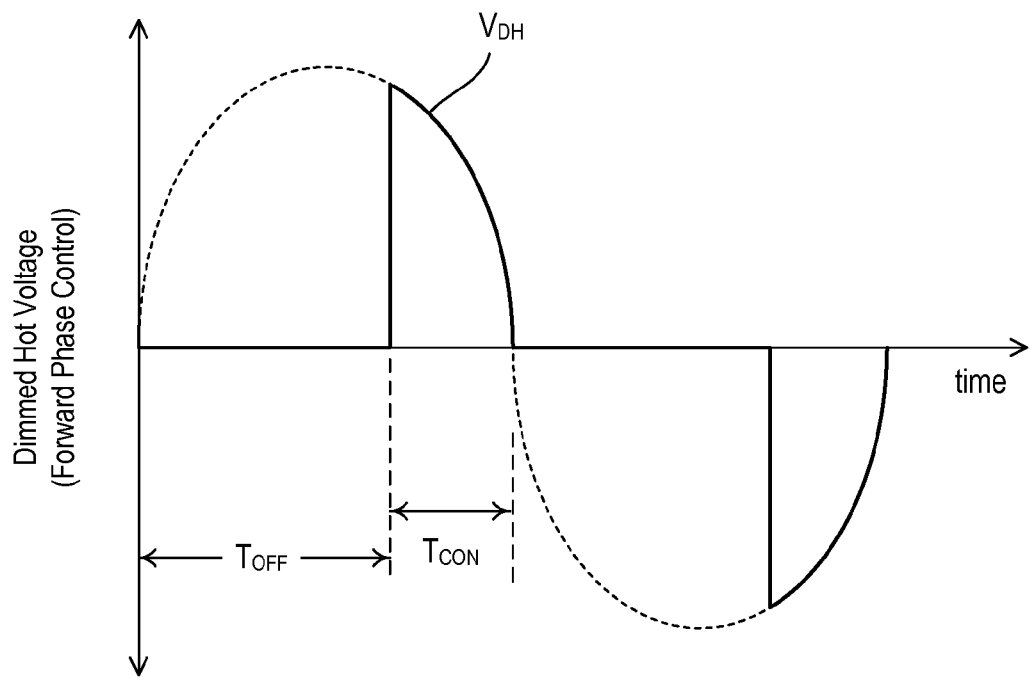
FIG. 4A illustrates an example waveform of a forward phase dimmed hot control signal that may be provided to a load.

FIG. 4A illustrates an example waveform of a dimmed hot voltage $V_{DH}$ (e.g., a forward phase control signal) that may be provided to a load (e.g., LED lamp 130) at a dimmed hot terminal (e.g., the dimmed hot terminal 104 of the dimmer switch 110). A bidirectional semiconductor switch (e.g., the bidirectional semiconductor switch 205) may be non-conductive during an off time $T_{OFF}$ and conductive during a conduction time $T_{CON}$. In the forward phase control signal, the bidirectional semiconductor switch may be non-conductive at the beginning of each half cycle and may turn on later in the half cycle, for example, in order to provide the desired light intensity at a lighting load. The bidirectional semiconductor switch may turn on at the beginning of the conduction time $T_{CON}$. The current conducted through an LED lamp may decrease (e.g., gradually decrease) at the end of each half cycle as the current provided by an AC power source decreases, for example, because the forward phase control signal may be initially non-conductive at the beginning of each half cycle and may then become conductive. An LED lamp having an inductive impedance may be best suited to receive a dimmed hot voltage with a gradual change in current. Thus, a forward phase control signal may be provided by a load control device (e.g., dimmer switch 110) to a load (e.g., LED lamp 130) having a predominately inductive impedance.

Figure 4B:
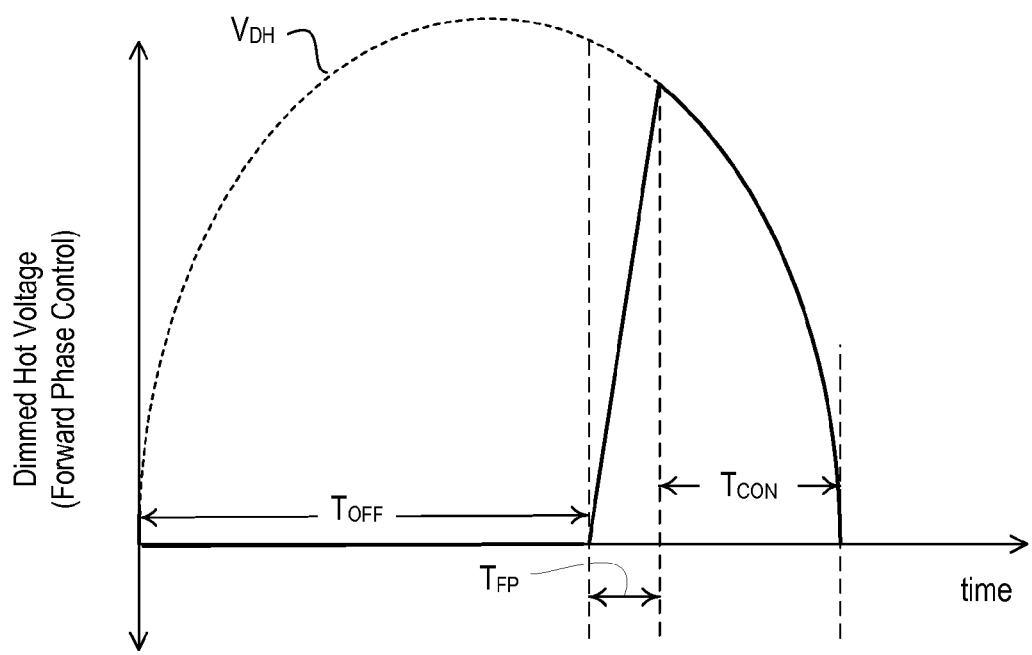
FIG. 4B illustrates a detailed view of a half cycle of an example waveform of a forward phase dimmed hot control signal that may be provided to a load.

FIG. 4B illustrates a detailed view of a half cycle of an example waveform of a dimmed hot voltage (e.g., the forward phase control signal of FIG. 4A) that may be provided to a load (e.g., the LED lamp 130). The example waveform of FIG. 4B may illustrate that the transition between the off time $T_{OFF}$ and the conductive time $T_{CON}$ of a forward phase control signal may not occur instantaneously. Rather, the bidirectional semi-conductor switch may transition from the non-conductive state to the conductive during a forward phase switching time $T_{FP}$. Although the example waveform of FIG. 4B illustrates the positive half cycle, the same transition behavior may apply in the negative half cycle of the forward phase control signal.

Figure 5:
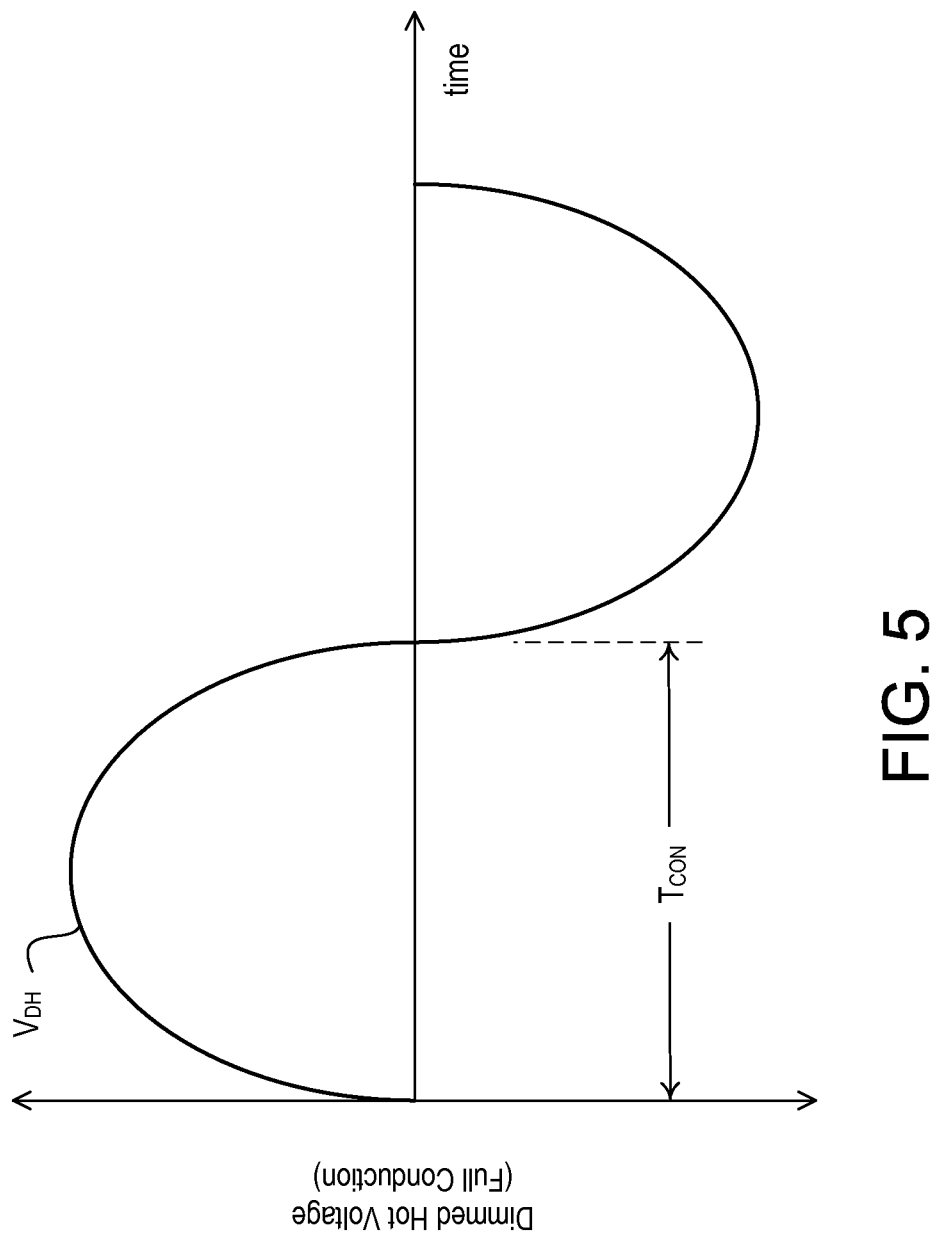
FIG. 5 illustrates an example waveform of a full conduction dimmed hot control signal that may be provided to a load.

FIG. 5 illustrates an example waveform of a full conduction voltage that may be provided to a load (e.g., LED lamp 130) at a dimmed hot terminal (e.g., the dimmed hot terminal 104 of the dimmer switch 110). The waveform of FIG. 5 may differ from the waveforms of FIGS. 3A and 4A in that a bidirectional semiconductor device (e.g., the bidirectional semiconductor switch 205) may be conductive for the entire duration of each half cycle. Thus, all of the AC line voltage from an AC power source may be provided to the LED lamp.

Figure 6:
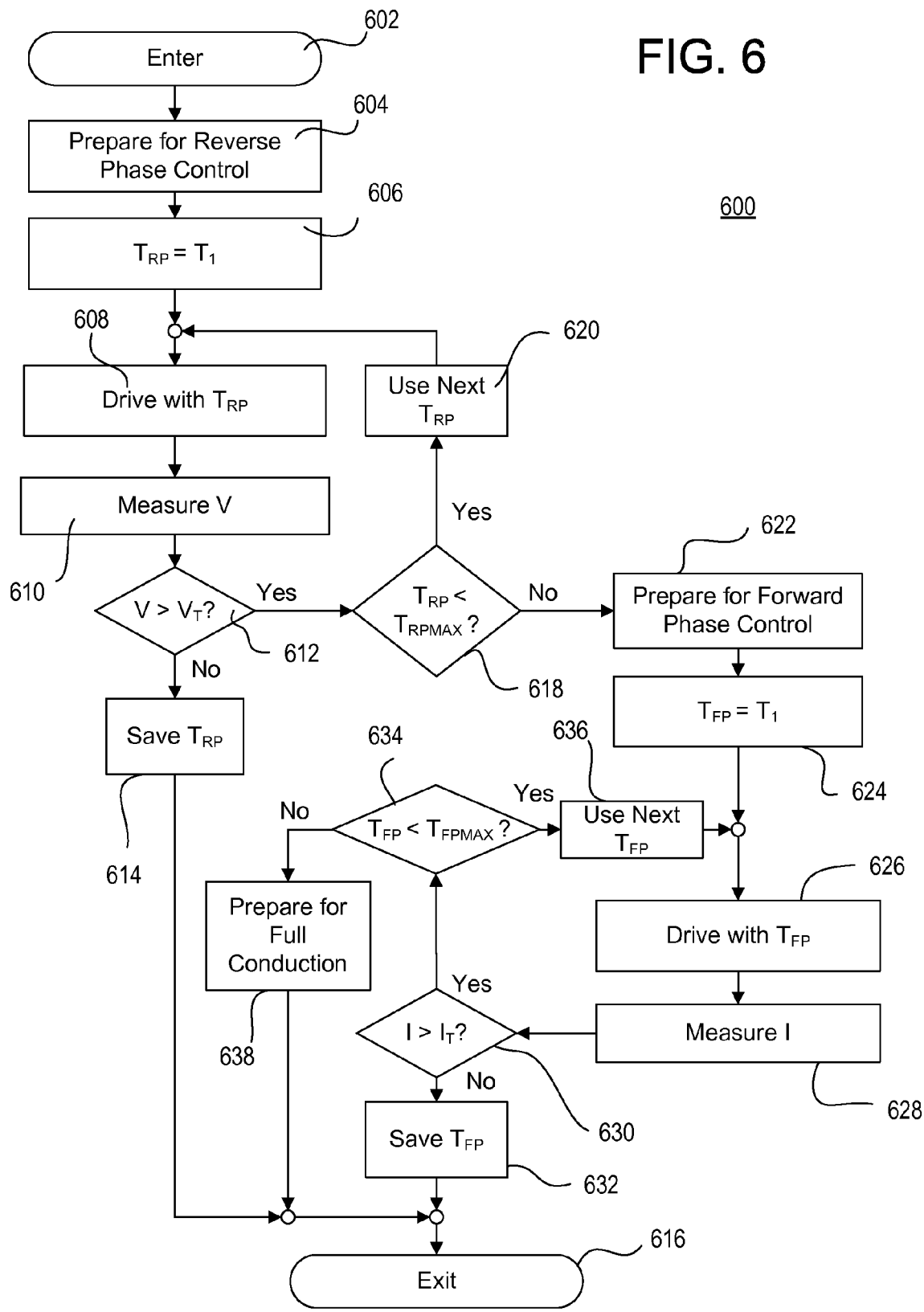
FIG. 6 is a flowchart of an example automatic setup procedure executed by a controller of a load control device.

FIG. 6 is a flowchart of an example automatic setup procedure 600 executed by a controller of a dimmer switch. The automatic setup procedure 600 may be executed by the controller 214 of the dimmer switch 210. This process may be entered at 602, for example, after the dimmer switch 210 is installed and powered for the first time. The automatic setup procedure 600 may be used, for example, to determine the type of load (e.g., LED light source) connected to the dimmer switch 210. For example, the automatic setup procedure 600 may determine the impedance characteristics of the load. Further, the automatic setup procedure 600 may determine the appropriate dimmed hot voltage that may be used to properly dim the load. For example, the automatic setup procedure 600 may determine whether a reverse phase control signal, a forward phase control signal, or a full conduction voltage is appropriate for the load. The automatic setup procedure may determine the appropriate switching time between the conduction time $T_{CON}$ and the off time $T_{OFF}$ (e.g., approximately 10 μs, 50 μs, 100 μs, etc.) of the dimmed hot voltage used to dim the load.

At 604, the controller 214 may prepare to provide a reverse phase control signal (e.g., as shown in FIG. 2A) to a load (e.g., an LED lamp), for example, via the dimmed hot (DH) terminal. The controller 214 may begin the automatic setup procedure 600 with a reverse phase control signal, for example, because the majority of LED lamps may have a capacitive impedance, and therefore, may be better suited to be controlled via a reverse phase control signal.

At 606, the controller 214 may set the reverse phase switching time $T_{RP}$ to a first time $T_1$ (e.g., approximately 10 μs). The controller 214 may provide the reverse phase control signal characterized by the first switching time $T_1$ to the load. For example, at 608, the controller 214 may control the bidirectional semiconductor switch 205 via the drive circuit 212 with the reverse phase switching time $T_{RP}$ (e.g., which may be 10 μs the first time that the automatic setup procedure 600 is executed).

The controller 214 may determine if the reverse phase control signal characterized by the first switching time $T_1$ is appropriate for the load. For example, the controller 214 may read an input signal from the voltage sense circuit 224 at 610. This input signal from the voltage sense circuit 224 may be representative of the magnitude of the dimmed hot voltage across the load during the reverse phase switching time $T_{RP}$. This voltage measurement may be used to assess the impedance characteristic of the LED driver. For example, if the impedance characteristic of the LED lamp is predominantly inductive, the measured voltage at the end of the reverse phase switching time $T_{RP}$ may be excessive (e.g., may indicate a voltage overshoot).

At 612, the controller 214 may determine whether the magnitude of the dimmed hot voltage is greater than a predetermined voltage threshold $V_T$. If the magnitude of the dimmed hot voltage is less than or equal to the predetermined voltage threshold $V_T$, the controller 214 may determine that the reverse phase control signal characterized by the first switching time $T_1$ is appropriate for the load. For example, the controller 214 may save the present value of the reverse phase switching time $T_{RP}$, for example, for use during normal operation, at 614 before exiting the automatic startup procedure 600 at 616. If at 612, the magnitude of the dimmed hot voltage is greater than the predetermined voltage threshold $V_T$, then the controller 214 may determine that the reverse phase control signal characterized by the first switching time $T_1$ is inappropriate for the load, and proceed to 618.

At 618, the controller 214 may compare the reverse phase switching time $T_{RP}$ to the maximum reverse phase switching time $T_{RPMAX}$ at 618. If the reverse phase switching time $T_{RP}$ is less than the maximum reverse phase switching time (e.g., approximately 100 μs), then the controller 214 may adjust the time of the reverse phase switching time $T_{RP}$. For example, the controller 214 may use a next predetermined time (e.g., approximately 50 μs) as the reverse switching time $T_{RP}$) at 620, or the controller 214 may use increase the reverse switching time $T_{RP}$ by a predetermined amount at 620. The controller 214 may be able to adjust the reverse phase switching time by sending a plurality (e.g., three) different control signals to the drive circuit 212. Each control signal may be operable to control the bidirectional semiconductor switch with a different switching time. For example, the control signals provided from the controller 214 may comprise a plurality (e.g., three) of different output ports of the controller 214, and each output port may be coupled to a different valued resistor within the drive circuit such that the drive circuit may control the bidirectional semiconductor switch to the appropriate switching time. After adjusting the reverse phase switching time $T_{RP}$ at 620, the controller 214 may repeat 608, 610, 612, and 618, for example, until a reverse phase control signal characterized by a switching time is reached that corresponds to a magnitude of a dimmed hot voltage that is less than or equal to the voltage threshold, or until a maximum switching time is reached.

If the reverse phase switching time $T_{RP}$ is greater than or equal to the maximum reverse phase switching time $T_{RPMAX}$ at 618, then the controller 214 may provide a forward phase control signal (e.g., as shown in FIG. 3B) at 622. For example, if the magnitude of the dimmed hot voltage measured by the voltage sense circuit 224 is greater than the voltage threshold using the maximum (e.g., slowest) reverse phase switching time, then the controller 214 may determine that the impedance characteristic of the LED lamp cannot be dimmed appropriately using a reverse phase control signal. As a result, the controller 214 may prepare to provide a forward phase control signal to control the LED lamp (e.g., the LED driver and LED light source).

At 624, the controller 214 may initialize the forward phase switching time $T_{FP}$ to a first time $T_1$ (e.g., approximately 10 μs). The controller 214 may provide the forward phase control signal characterized by the first switching time $T_1$ to the load. For example, at 626 the controller 214 may control the bidirectional semiconductor switch 210 via the drive circuit 212 with the forward phase switching time $T_{FP}$ (e.g., which may be 10 μs the first time though).

The controller 214 may determine if the forward phase control signal characterized by the first switching time $T_1$ is appropriate for the load. For example, the controller 214 may read an input signal from the current sense circuit 222 at 628. This input signal from the current sense circuit 222 may be representative of the magnitude of the current flowing through the LED lamp during the forward phase switching time $T_{FP}$. The magnitude of the measured current may be used to assess the impedance characteristic of the LED driver. For example, if the impedance characteristic of the LED lamp includes a dominant capacitive element, then the magnitude of the measured current may be large at the end of the forward phase switching time $T_{FP}$.

At 630, the controller 214 may determine whether the magnitude of the measured current is greater than a predetermined current threshold $I_T$. If the magnitude of the measured current is less than or equal to the predetermined current threshold $I_T$, the controller 214 may determine that the forward phase control signal characterized by the first switching time $T_1$ is appropriate for the load. For example, the controller 214 may save the present value of the forward phase switching time $T_{FP}$ for use during normal operation at 632 before exiting the automatic startup procedure 600 at 616. If at 630 the magnitude of the measured current is greater than the predetermined current threshold $I_T$, then the controller 214 may determine that the forward phase control signal characterized by the first switching time $T_1$ is inappropriate for the load.

The controller 214 may compare the forward phase switching time $T_{FP}$ to the maximum forward phase switching time $T_{FPMAX}$ at 634. If the forward phase switching time $T_{FP}$ is less than the maximum forward phase switching time (e.g., approximately 100 μs), then the controller 214 may increase the forward phase switching time. For example, the controller 214 may use the next predetermined time (e.g., approximately 50 μs) as the forward switching time at 636, or the controller 214 may use increase the forward switching time $T_{RP}$ by a predetermined amount at 636. After adjusting the forward phase switching time $T_{RP}$ at 636, the controller 214 may repeat 626, 628, 630, and 634. For example, the controller 214 may repeat 626, 628, 630, and 634 until a forward phase control signal characterized by a switching time is reached that corresponds to a magnitude of a measured current that is less than or equal to the current threshold, or until a maximum switching time is reached.

If the forward phase switching time $T_{FP}$ is greater than or equal to the maximum forward phase switching time $T_{FPMAX}$ at 634, then the controller 214 may provide a full conduction control voltage (e.g., as shown in FIG. 5) at 638 before exiting the process at 616. For example, if the magnitude of the current measured by the current sense circuit 222 is greater than the current threshold using the maximum (e.g., slowest) forward phase switching time, then the controller 214 may determine that both the inductive and capacitive characteristics of the LED lamp are too great to be dimmed appropriately using a forward phase control signal. As a result, the controller 214 may use a full conduction voltage to control the LED lamp (e.g., LED driver and LED light source).

Although not exemplified in FIG. 6, the controller 214 may further determine whether the LED lamp is stable when operating with the full conduction voltage. For example, the threshold $I_T$ and/or whether the magnitude of the dimmed hot voltage is less than the voltage threshold $V_T$ (e.g., as described with reference to 612 and 630). If the controller 214 determines that the LED lamp is not stable when operating with the full conduction voltage, then the controller 214 may turn off the bidirectional semiconductor switch 205, for example, to prevent unsafe operation of the dimmer switch 110.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A load control device for controlling an amount of power delivered from an alternating current (AC) power source to an electrical load, the load control device comprising:
   a memory; and
   a controller configured to:
      provide a first control signal of a first load control type, the first control signal being characterized by a first switching time;
      determine that the first control signal is inappropriate for the electrical load;
      provide a second control signal of the first load control type, the second control signal being characterized by a second switching time that is greater than the first switching time;
      determine that the second control signal is inappropriate for the electrical load;
      provide a third control signal of a second load control type, the third control signal being characterized by a third switching time;
      determine that the third control signal is appropriate for the lighting load; and
      store the second load control type and the third switching time in the memory.

2. The load control device of claim 1, wherein the first load control type is a reverse phase control type and the second load control type is a forward phase control type.

3. The load control device of claim 1, wherein the first load control type is a reverse phase control type and the second load control type is a full conduction control type.

4. The load control device of claim 1, wherein the first load control type is a forward phase control type and the second load control type is a reverse phase control type.

5. The load control device of claim 1, wherein the first load control type is a forward phase control type and the second load control type is a full conduction control type.

6. The load control device of claim 1, wherein the controller configured to determine that the first control signal is inappropriate for the electrical load comprises the controller configured to determine that a measured voltage across the electrical load during the first switching time exceeds a voltage threshold.

7. The load control device of claim 1, wherein the controller configured to determine that the first control signal is inappropriate for the electrical load comprises the controller configured to determine that a measured current through the electrical load during the first switching time exceeds a current threshold.

8. The load control device of claim 1, wherein the controller configured to determine that the third control signal is appropriate for the electrical load comprises the controller configured to determine that that a measured voltage across the electrical load during the third switching time is less than or equal to a voltage threshold.

9. The load control device of claim 1, wherein the controller configured to determine that the third control signal is appropriate for the electrical load comprises the controller configured to determine that that a measured current through the electrical load during the third switching time is less than or equal to a current threshold.

10. The load control device of claim 1, wherein the second load control type and the third switching time are used during a normal operation of the dimmer switch.

11. The load control device of claim 1, wherein the load control device is an electronic dimmer and the electrical load is a lighting load.

12. The load control device of claim 1, wherein the third switching time is equal to the first switching time.

13. The load control device of claim 1, wherein the third switching time is equal to the second switching time.

14. The load control device of claim 1, wherein the third switching time is greater than the second switching time.

15. The load control device of claim 1, wherein the third switching time is zero.

16. A load control device for controlling an amount of power delivered from an alternating current (AC) power source to an electrical load, the load control device comprising:
a memory; and
a controller configured to:
provide a first reverse phase control signal characterized by a first switching time;
determine that a first measured voltage across the electrical load during the first switching time exceeds a voltage threshold; and
provide a second reverse phase control signal characterized by a second switching time that is greater than the first switching time.

17. The load control device of claim 16, wherein the controller is configured to:
determine that a second measured voltage across the electrical load during the second switching time exceeds the voltage threshold;
provide a forward phase control signal characterized by a third switching time;
determine that a measured current through the electrical load during the third switching time is less than or equal to a current threshold; and
store the forward phase control signal and third switching time in the memory.

18. A method for controlling an amount of power delivered from an alternating current (AC) power source to an electrical load with a load control device, the load control device comprising a memory, the method comprising:
providing a first control signal of a first load control type, the first control signal being characterized by a first switching time;
determining that the first control signal is inappropriate for the electrical load;
providing a second control signal of the first load control type, the second control signal being characterized by a second switching time that is greater than the first switching time;
determining that the second control signal is inappropriate for the electrical load;
providing a third control signal of a second load control type, the third control signal being characterized by a third switching time;
determining whether the third control signal is appropriate for the electrical load; and
storing the second load control type and third switching time in the memory.

19. The method of claim 18, wherein the first load control type is a forward phase control type and the second load control type is a full conduction control type.

20. The method of claim 18, wherein determining whether the first control signal is inappropriate for the electrical load comprises determining whether a voltage across the electrical load exceeds a voltage threshold.

21. The method of claim 18, wherein determining whether the first control signal is inappropriate for the electrical load comprises determining whether a current through the electrical load exceeds a current threshold.

22. The method of claim 18, wherein determining whether the second control signal is appropriate for the electrical load comprises determining whether that a voltage across the electrical load is less than or equal to a voltage threshold.

23. The method of claim 18, wherein determining whether the second control signal is appropriate for the electrical load comprises determining whether that a current through the electrical load is less than or equal to a current threshold.

24. The method of claim 18, wherein the second load control type and the third switching time are used during a normal operation of the dimmer switch.

25. The method of claim 18, wherein the load control device is an electronic dimmer and the electrical load is a lighting load.

26. The method of claim 18, wherein the third switching time is equal to the first switching time.

27. The method of claim 18, wherein the third switching time is equal to the second switching time.

28. The method of claim 18, wherein the third switching time is slower than the second switching time.

29. The method of claim 18, wherein the third switching time is zero.

30. The method of claim 18, wherein the first load control type is a reverse phase control type and the second load control type is a forward phase control type.

31. The method of claim 18, wherein the first load control type is a reverse phase control type and the second load control type is a full conduction control type.

32. The method of claim 18, wherein the first load control type is a forward phase control type and the second load control type is a reverse phase control type.

33. A method for controlling an amount of power delivered from an alternating current (AC) power source to an electrical load with a load control device, the load control device comprising a memory, the method comprising:
providing to a lighting load a first reverse phase control signal characterized by a first switching time;
determining whether a first measured voltage during the first switching time exceeds a voltage threshold;
if the first measured voltage exceeds the voltage threshold, then providing to the lighting load a second reverse phase control signal characterized by a second switching time that is greater than the first switching time.

34. The method of claim 33, further comprising:
determining whether a second measured voltage during the second switching time exceeds the voltage threshold;
if the second measure voltage exceeds the voltage threshold, then providing to the lighting load a forward phase control signal characterized by a third switching time;
determining whether a measured current during the third switching time exceeds a current threshold; and
if the measured current does not exceed the current threshold, then storing the forward phase control signal and third switching time in the memory.

35. A load control device for controlling an amount of power delivered from an alternating current (AC) power source to an electrical load, the load control device comprising:
a memory; and
a controller configured to:
provide a first reverse phase control signal being characterized by a first switching time;
determine whether a first measured voltage across the electrical load during the first switching time exceeds a voltage threshold;
if the first measured voltage is less than or equal to the voltage threshold, store the first reverse phase control signal in the memory;
if the first measured voltage is greater than the voltage threshold, provide a second reverse phase control signal being characterized by a second switching time;
determine whether a second measured voltage across the electrical load during the second switching time exceeds the voltage threshold;
if the second measured voltage is less than or equal to the voltage threshold, store the second reverse phase control signal in the memory;
if the second measured voltage is greater than the voltage threshold, provide a third reverse phase control signal being characterized by a third switching time;
determine whether a third measured voltage across the electrical load during the third switching time exceeds the voltage threshold;
if the third measured voltage is less than or equal to the voltage threshold, store the third reverse phase control signal in the memory;
if the third measured voltage is greater than the voltage threshold, provide a first forward phase control signal being characterized by a fourth switching time;
determine whether a first measured current through the electrical load during the fourth switching time exceeds a current threshold;
if the first measured current is less than or equal to the current threshold, store the first forward phase control signal in the memory;
if the first measured current is greater than the current threshold, provide a second forward phase control signal being characterized by a fifth switching time;
determine whether a second measured current through the electrical load during the fifth switching time exceeds the current threshold;
if the second measured current is less than or equal to the current threshold, store the second forward phase control signal in the memory;
if the second measured current is greater than the current threshold, provide a third forward phase control signal being characterized by a sixth switching time;
determine whether a third measured current through the electrical load during the sixth switching time exceeds the current threshold;
if the third measured current is less than or equal to the current threshold, store the third forward phase control signal in the memory;
if the third measured current is greater than the current threshold, provide a full conduction control signal;
determining whether the full conduction control signal is appropriate for the lighting load;
if the full conduction control signal is appropriate for the lighting load, then storing the full conduction control signal in the memory; and
if the full conduction control signal is inappropriate for the lighting load, then turning off.

36. The load control device of claim 35, wherein the first switching time and the fourth switching time are approximately 10 μs, the second switching time and the fifth switching time are approximately 50 μs, and the third switching time and sixth switching time are approximately 100 μs.

* * * * *